United States Patent
Weng

(10) Patent No.: US 8,833,709 B2
(45) Date of Patent: Sep. 16, 2014

(54) MOBILE BASE DEVICE

(75) Inventor: Johnson Weng, Ningbo (CN)

(73) Assignee: MTM International, Ltd., Ningbo (CN)

( * ) Notice: Subject to any disclaimer, the term of this patent is extended or adjusted under 35 U.S.C. 154(b) by 31 days.

(21) Appl. No.: 13/305,699

(22) Filed: Nov. 28, 2011

(65) Prior Publication Data

US 2013/0134285 A1 May 30, 2013

(51) Int. Cl.
*F16M 11/42* (2006.01)

(52) U.S. Cl.
USPC .............. 248/129; 248/519; 248/910; 135/16

(58) Field of Classification Search
CPC . E04H 12/22; A45B 2023/0012; F16M 11/42
USPC .............. 248/129, 519, 126, 127, 145.6, 345,
248/346.01, 346.11, 351, 903, 910; 135/16;
410/66, 67; 280/8, 9, 10, 11, 43.13,
280/43.14, 43.17, 43.2, 43.24
See application file for complete search history.

(56) References Cited

U.S. PATENT DOCUMENTS

| | | | | |
|---|---|---|---|---|
| 1,092,220 A * | 4/1914 | Koch et al. | ................. | 280/43.14 |
| 1,282,736 A * | 10/1918 | Boehck et al. | ............. | 280/43.14 |
| 2,042,489 A * | 6/1936 | Williams | .................... | 280/43.14 |
| 2,379,476 A * | 7/1945 | Cleveland, Jr. | ............ | 280/43.15 |
| 2,624,590 A * | 1/1953 | Tilton | ........................ | 280/43.14 |
| 2,843,392 A * | 7/1958 | Simpkins | ................... | 280/43.14 |
| 3,080,196 A * | 3/1963 | Darby | ........................... | 298/1 R |
| 3,263,765 A * | 8/1966 | Just et al. | ..................... | 180/19.1 |
| 3,269,744 A * | 8/1966 | Dobson | ...................... | 280/43.17 |
| 3,637,233 A * | 1/1972 | Hoppl et al. | ............... | 280/43.14 |
| 4,008,902 A * | 2/1977 | Dill | ............................ | 280/43.23 |
| 4,291,891 A * | 9/1981 | Blanchette | ........................ | 280/9 |
| 4,311,215 A * | 1/1982 | Becker et al. | ..................... | 188/8 |
| 4,417,738 A * | 11/1983 | Kendall | ..................... | 280/43.17 |
| 5,035,445 A * | 7/1991 | Poulin | ....................... | 280/763.1 |
| 5,039,109 A * | 8/1991 | Mahoney et al. | ............. | 473/435 |
| 5,439,237 A * | 8/1995 | Kutchie | .......................... | 280/11 |
| 6,109,625 A * | 8/2000 | Hewitt | ....................... | 280/43.24 |
| 6,367,494 B1 * | 4/2002 | Tung | ................................ | 135/99 |
| 6,594,951 B1 * | 7/2003 | Reynolds | ........................... | 47/39 |
| 6,871,379 B2 * | 3/2005 | Ebeling et al. | .................... | 16/19 |
| 7,597,527 B2 * | 10/2009 | Rodriguez | ................. | 414/684.3 |
| 7,641,165 B2 * | 1/2010 | Li | ................................. | 248/519 |

(Continued)

*Primary Examiner* — Terrell McKinnon
*Assistant Examiner* — Eret McNichols
(74) *Attorney, Agent, or Firm* — Matthias Scholl P.C.; Matthias Scholl

(57) ABSTRACT

A mobile base device for a sun umbrella including a base cover. A bearing support is arranged inside the base cover and is hinged with a main lifting arm via a stiffened plate mounted thereon. An outer end of the main lifting arm is screwed to a lifting screw mounted on the bearing support via a lifting screw sleeve and an inner end of the main lifting arm is fixedly coupled to a set of secondary lifting arms through joints. A central portion of the set of secondary lifting arms is hinged with a set of stiffened plates mounted on the bearing support and a lower portion of the outer end of the set of secondary lifting arms is fixedly coupled to a set of casters. Such structure has the advantages of easy movement and fixation as well as practicality and convenience.

10 Claims, 6 Drawing Sheets

(56) References Cited

U.S. PATENT DOCUMENTS

| | | | |
|---|---|---|---|
| 8,141,967 B2* | 3/2012 | Yan | 312/351.13 |
| 8,511,693 B2* | 8/2013 | Gass et al. | 280/43.17 |
| 2005/0205727 A1* | 9/2005 | Nerger | 248/128 |
| 2007/0102599 A1* | 5/2007 | Lin | 248/129 |
| 2011/0232704 A1* | 9/2011 | Li | 135/16 |
| 2012/0024329 A1* | 2/2012 | Ma | 135/16 |
| 2012/0024330 A1* | 2/2012 | Ma | 135/16 |
| 2012/0025050 A1* | 2/2012 | Ma | 248/346.01 |

* cited by examiner

MOBILE BASE DEVICE

BACKGROUND OF THE INVENTION

1. Field of the Invention

The invention relates to the field of a sun umbrella, and more particularly to a mobile base device for a sun umbrella.

2. Description of the Related Art

Conventionally, a base of a sun umbrella is an integrated structure which further comprises an upper pole and canopy fixedly coupled thereto. Therefore, when the sun umbrella requires moving, it must be moved as a whole. Due to a large size and heavy weight of the umbrella, the process is highly inconvenient and time and labor consuming.

SUMMARY OF THE INVENTION

In view of the above-described problems, it is one objective of the invention to provide a mobile base device for a sun umbrella with convenient movement and fixation.

To achieve the above objective, in accordance with one embodiment of the invention, there is provided a mobile base device comprising a base cover, wherein a bearing support is arranged inside the base cover, the bearing support is hinged with a main lifting arm via a stiffened plate mounted thereon, one outer end of the main lifting arm is screwed to a lifting screw mounted on the bearing support via a lifting screw sleeve and one inner end of the main lifting arm is fixedly coupled to a set of secondary lifting arms via joints, a central portion of the set of secondary lifting arms is hinged with the stiffened plate mounted on the bearing support, and a lower portion of an outer end of the set of secondary lifting arms is fixedly coupled to a set of casters.

In a class of this embodiment, an upper portion of the lifting screw rotationally cooperates with the bearing support via a bearing and cooperates with the bearing to clamp an elastic collar for shaft and the bearing is arranged with a water seal ring.

In a class of this embodiment, a top of the lifting screw is spliced with a handle.

In a class of this embodiment, a bottom portion of the bearing support is fixedly coupled to a set of foot mats.

In a class of this embodiment, the inner end of the main lifting arm is fixedly arranged with a cross joint, which is fixedly coupled to four secondary lifting arms.

In a class of this embodiment, the casters are universal.

In a class of this embodiment, a set of saddle weights are arranged inside the bearing support and the stiffened plate is located between two adjacent saddle weights.

In a class of this embodiment, the top of the bearing support and the base cover are fixedly coupled to a foot tube by screws. An upper base cover is sleeved on the foot tube to cover the screws.

Advantages of the invention are summarized below. The lifting arm is hinged to an umbrella base via the bearing support and the lifting arm is able to move upwards or downwards by means of controlling the end of the main lifting arm by the handle, which allows the secondary lifting arm to drive the casters mounted thereon to drop or lift. Thus, the sun umbrella moves easily and rapidly when the casters touch the ground and can be securely fixed when the casters lift and the foot mats touch the ground. Such structure has the advantages of easy movement and fixation as well as practicality and convenience.

Figure 1:
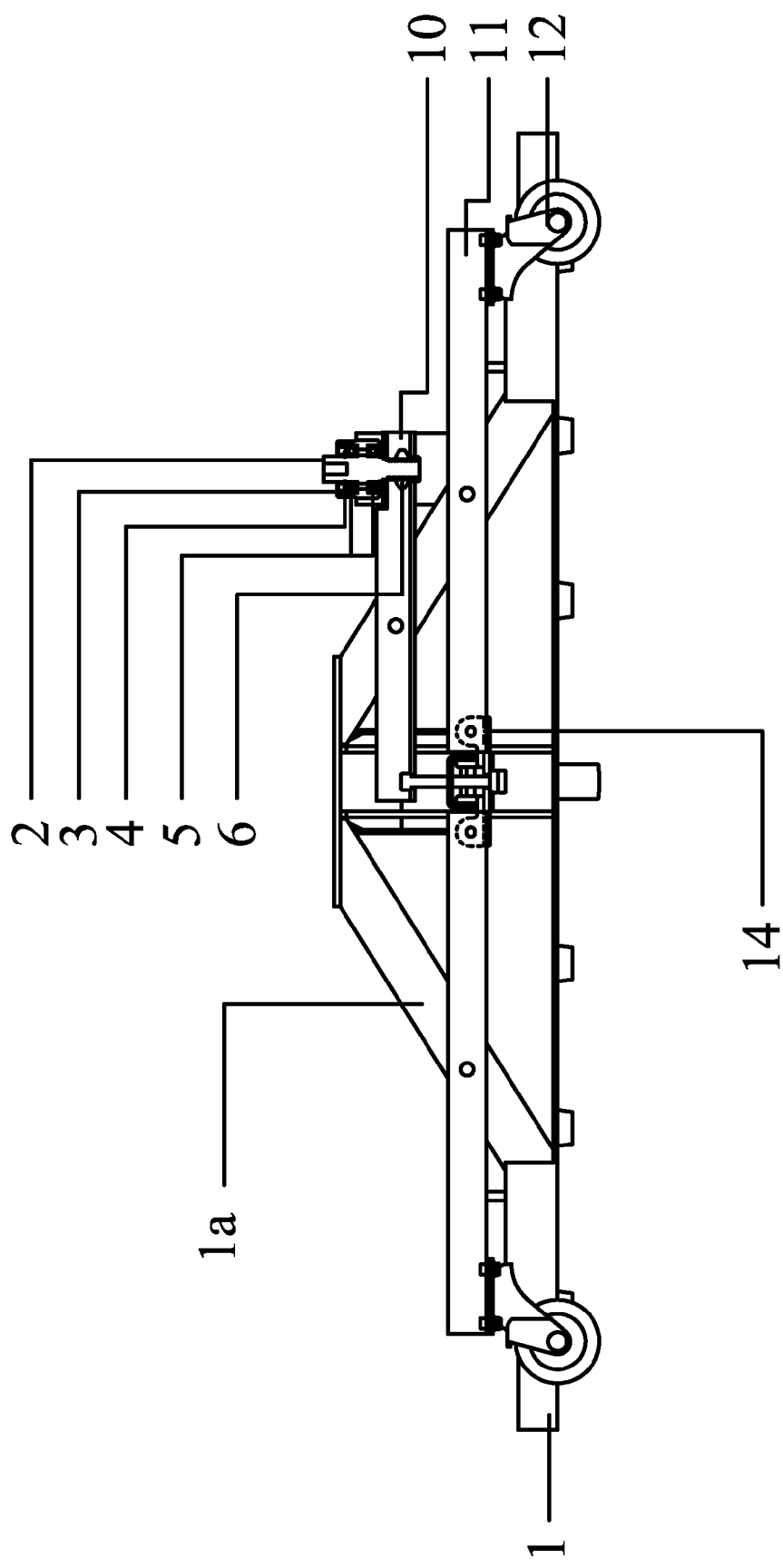
FIG. 1 is a schematic diagram of a mobile base device according to one embodiment of the invention.
Figure 2:
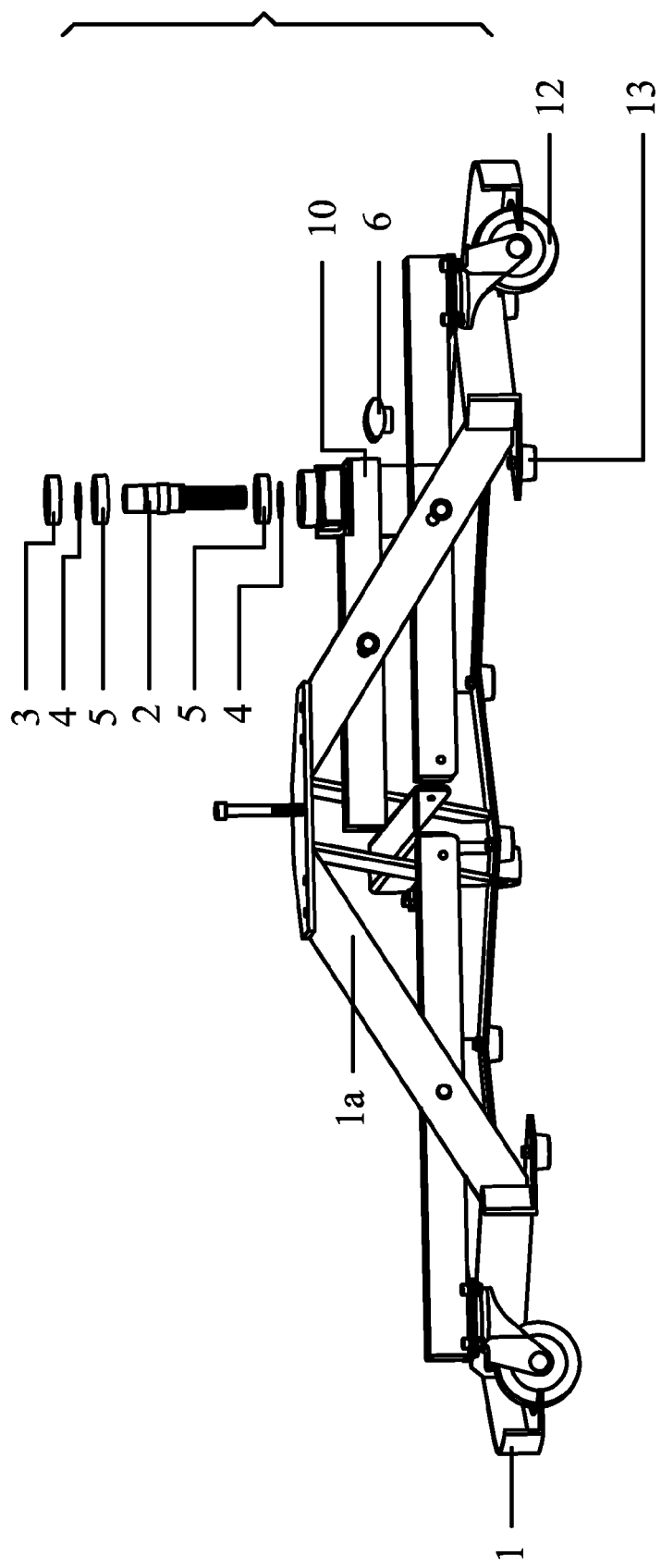
FIGS. 2-5 are exploded views of a mobile base device according to one embodiment of the invention.
Figure 3:
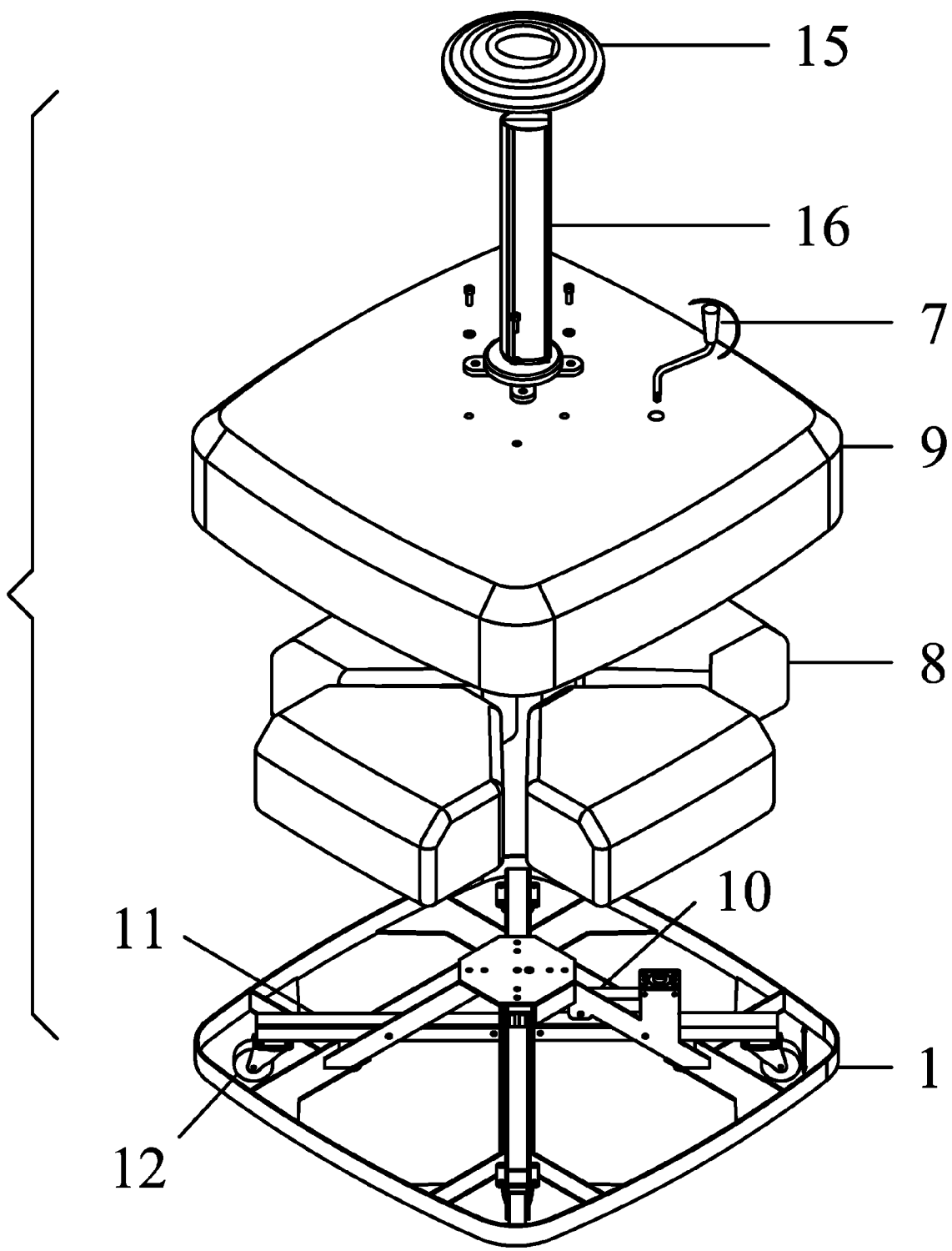
Figure 4:
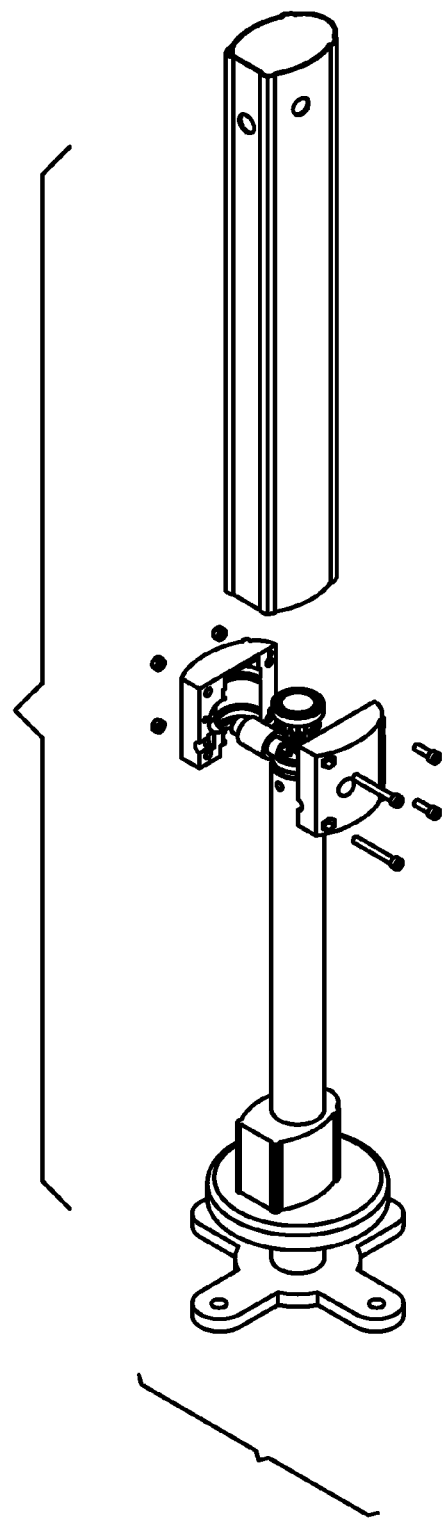
Figure 5:
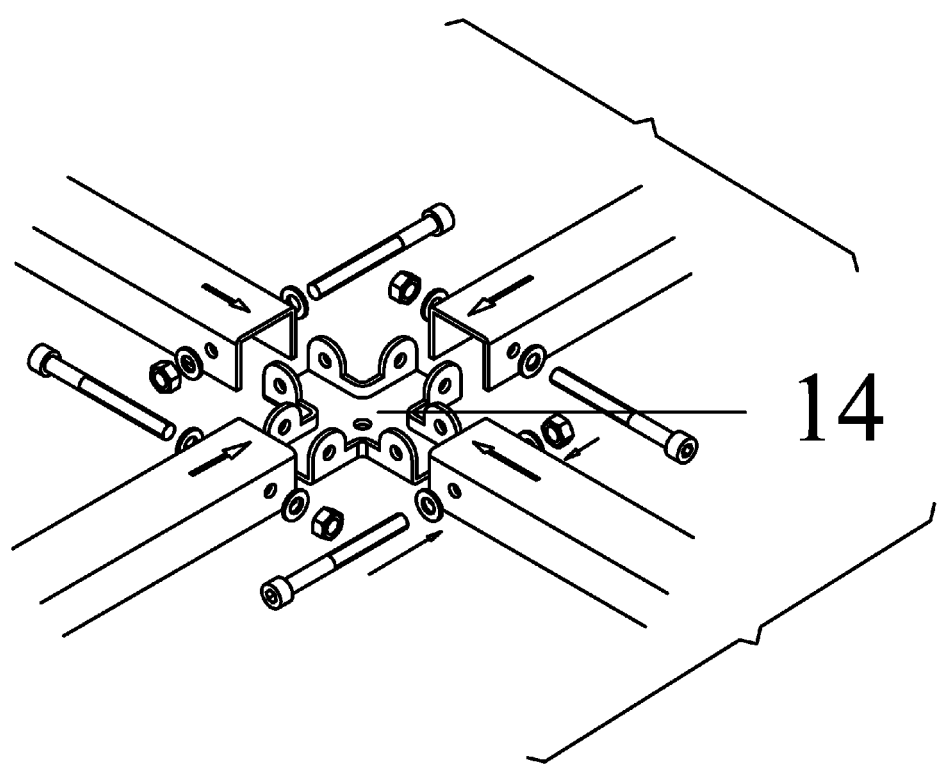

In the drawings, the following reference numbers are used: 1. Bearing support; 1a. Stiffened plate; 2. Lifting screw; 3. Water seal ring; 4. Elastic collar for shaft. 5. Bearing; 6. Lifting screw sleeve; 7. Handle; 8. Saddle weight; 9. Base cover; 10. Main lifting arm; 11. Secondary lifting arm; 12. Caster; 13. Foot mat; 14. Cross joint; 15. Upper base cover; 16. Foot tube.

DETAILED DESCRIPTION OF THE EMBODIMENTS

The invention is explained in further detail below with the aid of the attached drawing.

As shown in FIG. 1, a mobile base device of the invention comprises a base cover 9. A bearing support 1 having a set of foot mats 13 is arranged inside the base cover 9. The bearing support 1 is hinged with a main lifting arm 10 via a stiffened plate 1a mounted thereon. An outer end of the main lifting arm 10 is screwed to a lifting screw 2 mounted on the bearing support 1 via a lifting screw sleeve 6 and an inner end of the main lifting arm is fixedly coupled to a set of secondary lifting arms 11 through joints. Central portions of the set of secondary lifting arms 11 are hinged with the stiffened plate 1a mounted on the bearing support 1 and a lower portion of the outer end of the set of secondary lifting arms is fixedly coupled to a set of casters 12.

The mobile base device of the invention employs the bearing support 1 to arrange the main lifting arm 10 and the secondary lifting arms 11 and enable the main lifting arm 10 and the secondary lifting arms 11 to lift or drop the casters 12 mounted at an outer end of the secondary lifting arms 11 so as to achieve movement and fixation of the sun umbrella.

In accordance with one embodiment of the invention, an upper portion of the lifting screw 2 rotationally cooperates with the bearing support 1 via bearings 5 and cooperates with the bearings 5 to clamp an elastic collar for shaft 4. Each of the bearings 5 is arranged with a water seal ring 3. Such structure helps lubrication and sealing of the bearings and ensures smooth rotation of the lifting screw 2 within the bearing seat hole of the bearing support 1. The top of the lifting screw 2 cooperates with a handle 7, making it easier to operate the lifting screw 2. An inner end of the main lifting arm 10 is fixedly arranged with a cross joint 14, which is fixedly coupled to four secondary lifting arms 11 and the casters 12. Such structure is beautiful symmetrically and more stable. The casters 12 are universal, allowing the sun umbrella to be easily moved in every direction. A set of saddle weights 8 are arranged inside the bearing support 1 and the stiffened plate 1a is located between two adjacent saddle weights 8. The saddle weights 8 increase the weight bearing of the base, making the sun umbrella more stable and not liable to decline or tilt.

As shown in FIGS. 2-5, the mobile base device is mounted as follows. The casters are aligned with four holes of the secondary lifting arms 11. Hexagon socket head cap screws are put on, and steel spacers and outer hexagon screws are screwed to finish the installation of the secondary lifting arms. Press one of the bearings 5 into the bearing seat hole (lower hole) of the bearing support 1, put on the lifting screw 2 and the elastic collar for shaft 4, put another bearing 5 through the lifting screw 2, press it into the bearing seat hole (upper hole) of the bearing support 1 and put on the elastic collar for shaft 4 and water seal ring 3. Put round head cross screws through the foot mats 13 and a lower frame hole of the bearing support and then screw on two outer hexagon nuts. Insert hexagon socket head cap screws into the slot of the main lifting arm 10 and mount it on the bearing support 1, put the lifting screw sleeve 6 into the slot (long hole slot) of the main lifting arm 10 and screw it with the lifting screw 2, put the hexagon socket head cap screws mounted at the central portion of the main lifting arm 10 through the stiffened plate 1a of the bearing support 1, adjust the spacers, main lifting arm 10, friction spacers and the other stiffened plate 1a and then put on steel spacers and screw on outer hexagon nuts. Align the cross joint 14 with the holes and put it in the hexagon socket head cap screws of the main lifting arm 10 and screw two outer hexagon screws; insert the secondary lifting arm components into the center of the stiffened plate 1a of the bearing support 1, align the central holes to allow the hexagon socket head cap screws of the secondary lifting arms 11 pass through the stiffened plate 1a of the bearing support 1, friction spacers, secondary lifting arms 11 and the stiffened plate 1a (the other one) of the bearing support 1, and then put on steel spacers and screw on outer hexagon nuts; align the holes of the secondary lifting arms 11 to those of the cross joint 14, put on the hexagon socket head cap screws and steel spacers, screw on the outer hexagon screws and then adjust and tighten the outer hexagon nuts mounted at the bottom of the cross joint 14; mount four saddle weights 8 and cover the upper base cover 9 to finish the assembly of the mobile base device.

As shown in FIGS. 1-5, in use, the handle 7 is inserted into the square hole located at the top of the lifting screw 2 and then the handle 5 is rotated anticlockwise (or clockwise) to drop (or lift) the lifting screw 6 to enable the main lifting arm 10 and the secondary lifting arms 11 to make the casters 12 move downwards (or upwards). When a sun umbrella is required, users can rotate the handle 7 to drop the casters 12 and then push the umbrella base to move when the foot mats 13 have an appropriate height from the ground. When the base is at the intended position, rotate the handle 7 to lift the casters 12, allowing the foot mats 13 to be fully against the ground to fix the base.

Figure 6:
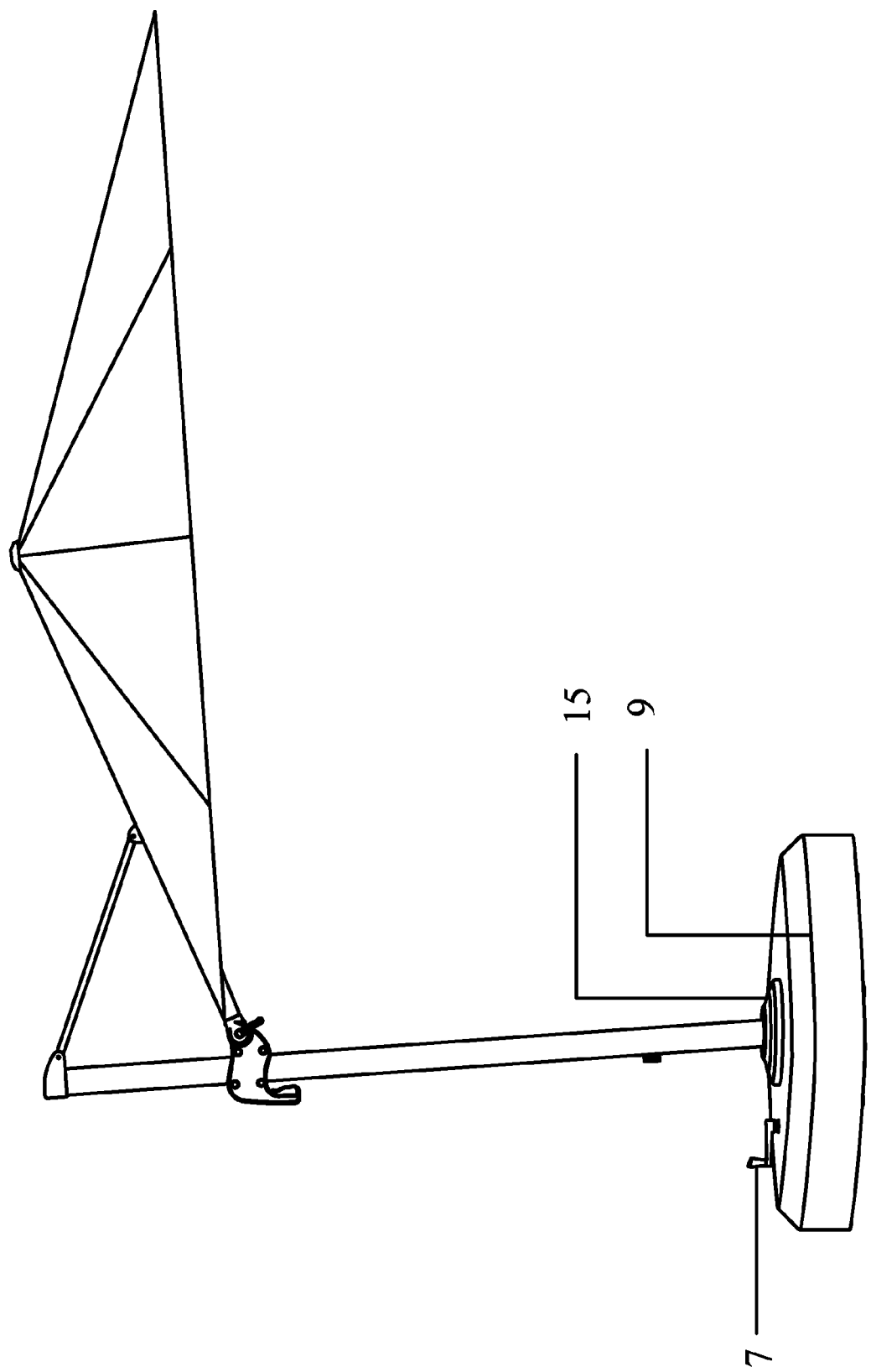
FIG. 6 is a schematic diagram of a mobile base device according to one embodiment of the invention used for a sun umbrella.

As shown in FIG. 6, the top of the bearing support 1 and the base cover 9 are fixedly coupled to the foot tube 16 by screws for mounting the upper pole and canopy of the umbrella. An upper base cover 15 is sheathed on the foot tube 16 to cover the screws. Such structure is simple and beautiful.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A mobile base device for supporting a sun umbrella, the sun umbrella having a pole, the mobile base device comprising:
   a) a base cover (9);
   b) a bearing support (1);
   c) a main lifting arm (10);
   d) a plurality of stiffened plates (1a);
   e) a plurality of secondary lifting arms (11);
   f) a plurality of casters (12); and
   g) a joint;
wherein:
   the bearing support (1) is arranged inside the base cover (9);
   lower ends of the plurality of stiffened plates (1a) are mounted on the bearing support (1);
   upper ends of the plurality of stiffened plates (1a) are connected together for receiving the pole;
   a central portion of the main lifting arm (10) is pivotally connected to one of the plurality of stiffened plates (1a);
   one outer end of the main lifting arm (10) is screwed to a lifting screw (2) mounted on the bearing support (1) via a lifting screw sleeve (6) and one inner end of the main lifting arm (10) is fixedly coupled to the plurality of secondary lifting arms (11) through the joint;
   inner ends of the plurality of secondary lifting arms (11) are coupled to the joint;
   central portions of the plurality of secondary lifting arms (11) are respectively pivotally connected to the plurality of stiffened plates (1a);
   lower portions of outer ends of the plurality of secondary lifting arms (11) are respectively fixedly coupled to the plurality of casters (12); and
   a plurality of saddle weights (8) is arranged inside the bearing support (1) and the plurality of stiffened plates (1a) is located between two adjacent saddle weights (8).

2. The mobile base device of claim 1, wherein a bearing (5), an elastic collar (4), and a water seal ring (3) are fixedly coupled to an upper portion of the lifting screw (2) to rotationally cooperate the lifting screw (2) with the bearing support (1).

3. The mobile base device of claim 1, wherein a top of the lifting screw (2) is spliced with a handle (7).

4. The mobile base device of claim 1, wherein a bottom portion of the bearing support (1) is fixedly coupled to a plurality of foot mats (13).

5. The mobile base device of claim 1, wherein the joint is a cross joint (14), a number of the plurality of secondary lifting arms (11) is 4, a number of the plurality of stiffened plates (1a) is 4, and a number of the plurality of casters (12) is 4.

6. A mobile base device for supporting a sun umbrella, the sun umbrella having a pole, the mobile base device comprising:
   a) a base cover (9);
   b) a bearing support (1);
   c) a main lifting arm (10);
   d) a plurality of stiffened plates (1a);
   e) a plurality of secondary lifting arms (11);
   f) a plurality of casters (12); and
   g) a joint;
wherein:
   the bearing support (1) is arranged inside the base cover (9);
   lower ends of the plurality of stiffened plates (1a) are mounted on the bearing support (1);
   upper ends of the plurality of stiffened plates (1a) are connected together for receiving the pole;
   a central portion of the main lifting arm (10) is pivotally connected to one of the plurality of stiffened plates (1a);
   one outer end of the main lifting arm (10) is screwed to a lifting screw (2) mounted on the bearing support (1) via a lifting screw sleeve (6) and one inner end of the main lifting arm (10) is fixedly coupled to the plurality of secondary lifting arms (11) through the joint;
   inner ends of the plurality of secondary lifting arms (11) are coupled to the joint;
   central portions of the plurality of secondary lifting arms (11) are respectively pivotally connected to the plurality of stiffened plates (1a);

lower portions of outer ends of the plurality of secondary lifting arms (11) are respectively fixedly coupled to the plurality of casters (12); and a top of the bearing support (1) and the base cover (9) are fixedly coupled to a foot tube (16) by screws; and an upper base cover is sleeved on the foot tube to cover the screws.

7. The mobile base device of claim 6, wherein a bearing (5), an elastic collar (4), and a water seal ring (3) are fixedly coupled to an upper portion of the lifting screw (2) to rotationally cooperate the lifting screw (2) with the bearing support (1).

8. The mobile base device of claim 6, wherein a top of the lifting screw (2) is spliced with a handle (7).

9. The mobile base device of claim 6, wherein a bottom portion of the bearing support (1) is fixedly coupled to a plurality of foot mats (13).

10. The mobile base device of claim 6, wherein the joint is a cross joint (14), a number of the plurality of secondary lifting arms (11) is 4, a number of the plurality of stiffened plates (1*a*) is 4, and a number of the plurality of casters (12) is 4.

\* \* \* \* \*